United States Patent Office 2,768,966
Patented Oct. 30, 1956

2,768,966

GLUTAMIC ACID DERIVATIVES AND PROCESS OF PRODUCING SAME

Bruno Vassel, Deerfield, Ill., assignor to International Minerals & Chemical Corporation, a corporation of New York No Drawing. Application January 30, 1953,
Serial No. 334,371

9 Claims. (Cl. 260—482)

The instant invention relates to methods for the preparation of new glutamic acid derivatives. More particularly, it relates to methods for the preparation of new glutamic acid derivatives from which optically active natural glutamine is produced.

In the past, glutamine has been synthesized by only two processes both of which are a complicated series of steps. Because of the nature of the reactions involved and because of the plurality of steps, yields have been very low. Generally between about a 5% and about a 15% yield is obtained using the best known synthesis, that is, the carbobenzoxy method of Bergmann, Zervas, and Salzmann, Berichte 66B, 1288–90 (1933), and the method of Kidd and King, Nature, 162, 766 (1948). In addition to these disadvantages in the Bergmann method there was the hazard involved in working with benzyl chloroformate, which is a reactant in one of the steps of these processes. Upon standing and/or drying, this compound spontaneously decomposes in an explosive manner and in the past has caused serious injury to workers. Heretofore, there has been no commercially acceptable method for synthesizing glutamine. In the Kidd and King method, there are an even greater number of steps involved than in the Bergmann method, and the reagent employed, which is phthalic anhydride, tends to racemize the glutamic acid and the glutamine produced is not the pure optically active form.

It is an object of the instant invention to provide an improved method for the synthesis of the optically active natural glutamine.

It is a further object of the instant invention to provide a method for synthesizing the optically active natural glutamine in comparatively high yields without resorting to the production and resolution of the racemic mixture.

It is a further object of the instant invention to provide an improved synthesis of optically active natural glutamine in which comparatively high yields are obtained from reactants and intermediates which are not hazardous.

It is a further object of the instant invention to prepare new compounds from which optically active natural glutamine is produced.

It is a further object of the instant invention to provide a commercially acceptable method for the synthesis of optically active natural glutamine.

These and other objects of the instant invention will become more apparent upon a fuller understanding of the invention as hereinafter described.

Glutamine is obtained by the amidation of a new derivative of a gamma ester of glutamic acid to produce a new gamma amide derivative of glutamic acid, followed by the reduction of the new gamma amide of glutamic acid to glutamine. By the term glutamine as used herein is meant the optically active natural form of glutamine.

The new derivative of the gamma ester is prepared by the reaction of a gamma ester of the natural optically active isomer of glutamic acid with a chloroformate of an allyl compound. For example, allyl chloroformate reacts with a gamma ester of L-glutamic acid, such as the gamma-methyl, -ethyl, -isopropyl, -butyl ester, or the like, to produce the gamma ester of N-carboallyloxy-L-glutamic acid. This compound is amidated with ammonia to produce a new glutamic acid derivative, namely, the gamma amide of N-carboallyloxy-L-glutamic acid. This amide is then reduced to glutamine. The carboallyloxy group of this gamma amide can be removed by reduction with liquid ammonia in the presence of sodium, by catalytic hydrogenation or by any other suitable reduction. The reduction is carried out without cyclization of the glutamine. Although a conventional reducing agent, such as hydrogen in the presence of a catalyst, such as platinum or palladium on carbon which are comparatively very expensive, can be employed for this reduction, it has been found that liquid ammonia and sodium is preferably employed to remove the carboallyloxy group. In the processes of Bergmann, Zervas and Salzmann previously mentioned, sodium and liquid ammonia cannot be used to reduce the carbobenzoxy group to obtain glutamine.

In one embodiment of the instant invention, the gamma-methyl ester of L-glutamic acid is reacted with allyl chloroformate in the presence of a magnesium oxide catalyst. When the reaction has proceeded to substantial completion, the reaction mixture is extracted with chloroform to remove unreacted allyl chloroformate. The aqueous residue is acidified with hydrochloric acid and reextracted with chloroform, with the resulting chloroform solution containing the gamma ester of N-carboallyloxy-L-glutamic acid. The gamma ester is amidated with ammonia to obtain a new gamma amide derivative of glutamic acid. Amidating reagents that can be employed are aqueous or alcoholic ammonia or liquid ammonia. Amidation is preferably carried out at a temperature between about 50° C. and about 60° C. for between about 20 and about 24 hours. When a lower temperature is employed, the time for the amidation to proceed to completion is extended. The gamma amide of N-carboallyloxy-L-glutamic acid is produced. The reaction products are evaporated to dryness and metallic sodium and liquid ammonia are added to the amide. Glutamine is recovered from the resulting reaction products.

In carrying out the instant invention, any gamma ester of L-glutamic acid may be employed. However, the gamma methyl ester is preferred because yields of glutamine obtained in the synthesis are higher than when other gamma esters of L-glutamic acid are employed.

The gamma ester reacts with the chloroformate of an allyl compound, such as allyl chloroformate, methallyl chloroformate, and phenallyl chloroformate. This reaction of the ester and the allyl chloroformate is exothermic, with the reactants being generally admixed at a temperature between about 0° C. and about 15° C., preferably at between about 5° C. and about 10° C. The temperature of the resulting mixture is allowed to rise to about atmospheric temperature, and, in a preferred embodiment, the mixture is agitated at about atmospheric temperature for between about one-half and about two hours. The resulting reaction products are extracted with a solvent to separate the unreacted allyl chloroformate. An organic solvent such as chloroform, carbon tetrachloride, methylene chloride, or ethylene dichloride is used. The aqueous residue is then acidified, for example, with hydrochloric acid to a pH between about 1.5 and about 2.5. The gamma ester of N-carboallyloxy-L-glutamic acid is extracted from the acidified solution with a solvent such as chloroform, carbon tetrachloride, methylene chloride, ethylene dichloride, ether, ethylacetate, and the like. In a preferred embodiment the product is extracted with chloroform and the chloroform extract is dried, for example, with anhydrous calcium sulfate or sodium sulfate. It is not necessary to dry the solution, but yields are improved by doing so. The solvent, such as chloroform, is then separated from the gamma ester of N-carboallyloxy-L-glutamic acid, for example, by evaporation.

The gamma ester of N-carboallyloxy-L-glutamic acid is then amidated with ammonia to produce the new gamma amide derivative of N-carboallyloxy-L-glutamic acid. Concentrated ammonium hydroxide, or liquid ammonia, or absolute methanol saturated with ammonia may be employed for the amidation of the ester. In one embodiment, about a 28% ammonium hydroxide solution is employed at a temperature between about 50° C. and about 60° C. in a pressure vessel. When lower temperatures are employed, the yields obtained are lower. In another embodiment liquid ammonia is employed in a pressure vessel at about atmospheric temperature to amidate the gamma ester. In another embodiment the amidation is carried out by saturating methanol with ammonia at about 0° C., admixing with the gamma ester and heating to between about 45° C. and about 50° C. in a pressure vessel. Ammonia is removed from the gamma amide, for example, by evaporation.

The gamma amide of N-carboallyloxy-L-glutamic acid is then reduced to glutamine. In one embodiment, liquid ammonia and sodium are added to the gamma amide which has been evaporated to dryness to reduce this compound to glutamine. The reduction is substantially complete when the solution becomes a permanent blue color. The glutamine solution is then acidified to a pH between about 4.5 and about 6.0, preferably about 5.5 with an acid. An acid, the sodium and ammonium salt of which is soluble in alcohol, such as hydroiodic acid, formic acid, or the like is employed. An alcohol such as methanol, ethanol, a combination of methanol and acetone, or isopropanol is added. Glutamine is insoluble in the alcoholic solution, and is separated from the solution. The overall yield of glutamine based upon glutamic acid is generally between about 31% and about 36%.

As a specific example of the process, the following serves merely as illustration, but it is not intended that the scope of the invention be limited thereto.

*Example*

About one mole of L-glutamic acid was mixed with between about 6 and about 10 moles of anhydrous methanol. The reaction was carried out at about room temperature in the presence of about one mole of dry sulfuric acid. The reaction generally was completed in between about 16 hours and about 22 hours. The sulfate was removed from the gamma ester of glutamic acid by adding diethylamine, and the ester was separated by filtration. The gamma ester was then reacted with about 1.15 moles of allyl chloroformate in the presence of about 1.2 moles of magnesium hydroxide catalyst. The chloroformate was added dropwise, and the temperature of the reaction mixture was maintained at about 8° C. After the addition was completed, the temperature of the mixture was allowed to rise to about atmospheric temperature and was stirred for between about one-half and about one hour. The resulting reaction products were extracted with chloroform. The aqueous solution remaining was acidified with hydrochloric acid to a pH of about 2.2, and the ester of N-carboallyloxy-L-glutamic acid was extracted from the acidified solution with chloroform. The chloroform solution was dried with anhydrous sodium sulfate. The chloroform was evaporated from the resulting dried solution, and the gamma methyl ester of N-carboallyloxy-L-glutamic acid was obtained.

This new derivative of glutamic acid was a white solid and had a melting point of about 48° C. to 50° C. The specific rotation was minus 16.2 degrees at 28° C. when 4.08 grams were dissolved in 100 mls. of water. The refractive index of the compound at 26.5° C. was 1.473. The nitrogen content was determined as 5.83%, as compared to 5.71% theoretical or calculated nitrogen content.

This product was allowed to react with about 28% ammonium hydroxide in a pressure bottle at a temperature between about 50° C. and about 55° C. The reaction was completed in between about 20 hours and about 24 hours. Ammonia was evaporated under vacuum from the product at about 50° C. The product was the gamma amide of N-carboallyloxy-L-glutamic acid.

The ammonium salt of this new compound was hygroscopic, brittle and glass-like. It had a specific rotation of minus 2.1 degrees at 26° C., when 4.25 gms. were dissolved in 100 mls. of water. The nitrogen content of this compound was determined at 16.8%; the theoretical nitrogen content is 17.0%.

The gamma amide was dissolved in liquid ammonia at about —34° C., and metallic sodium was added to the resulting solution. When the solution acquired a permanent blue color, the reduction was substantially complete, and the solution was evaporated to dryness. The residue was dissolved in water, and the solution was acidified to a pH of about 5.5 with hydroiodic acid. Methanol was added and the L-glutamine separated upon cooling and standing. The yield of L-glutamine was about 35.4% based upon glutamic acid.

Having thus fully described and illustrated the character of the instant invention, what is desired to be secured and claimed by Letters Patent is:

1. The gamma amide of carboallyloxy-L-glutamic acid having the formula

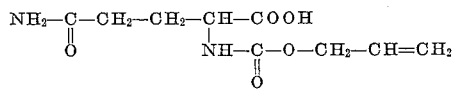

2. A process for the production of L-glutamine which comprises reducing the gamma amide of N-carboallyloxy-L-glutamic acid to L-glutamine.

3. A process for the production of L-glutamine which comprises adding liquid ammonia and metallic sodium to the gamma amide of N-carboallyloxy-L-glutamic acid, and separating L-glutamine from the resulting reaction products.

4. A process for the production of L-glutamine which comprises amidating a gamma lower alkyl ester of N-carboallyloxy-L-glutamic acid with ammonia, and reducing the resulting amide to L-glutamine.

5. A process for the production of L-glutamine which comprises amidating a gamma lower alkyl ester of N-carboallyloxy-L-glutamic acid with ammonia, separating the gamma amide of N-carboallyloxy-L-glutamic acid from the amidation reaction products, adding liquid ammonia and metallic sodium to the amide, and separating L-glutamine from the resulting reaction products.

6. A process for the production of L-glutamine which comprises reacting a gamma lower alkyl ester of L-glutamic acid with an allyl chloroformate in the presence of magnesium oxide catalyst, separating the gamma ester of N-carboallyloxy-L-glutamic acid from the reaction products, amidating the gamma ester of N-carboallyloxy-L-glutamic acid with ammonia to produce the gamma amide, separating the resulting gamma amide of N-carboallyloxy-L-glutamic acid from the amidation products, and reducing the gamma amide to L-glutamine.

7. A process for the production of L-glutamine which comprises reacting a gamma lower alkyl ester of L-glutamic acid with allyl chloroformate in the presence of magnesium oxide catalyst at a temperature between about 0° C. and about atmospheric temperature, separating the gamma ester of N-carboallyloxy-L-glutamic acid from the reaction products, amidating the gamma ester with ammonia to produce the gamma amide of N-carboallyloxy-L-glutamic acid, separating the gamma amide from the amidation products, adding liquid ammonia and metallic sodium to the gamma amide, and separating L-glutamine from the resulting reaction products.

8. A process for the production of L-glutamine which comprises reacting the gamma methyl ester of L-glutamic acid with allyl chloroformate in the presence of magnesium oxide catalyst, separating the resulting gamma methyl ester of N-carboallyloxy-L-glutamic acid from the reaction products, amidating the gamma ester with ammonia to produce the gamma amide of N-carboallyloxy-L-glutamic acid, and reducing said gamma amide to L-glutamine.

9. A process for the production of L-glutamine which comprises reacting the gamma methyl ester of L-glutamic acid with allyl chloroformate in the presence of magnesium oxide catalyst at a temperature between about 0° C. and about atmospheric temperature, separating the resulting gamma methyl ester of N-carboallyloxy-L-glutamic acid from the reaction products, amidating the ester with ammonia to produce the gamma amide of N-carboallyloxy-L-glutamic acid, separating the gamma amide from the reaction products, adding liquid ammonia and metallic sodium to the gamma amide, and recovering the optically active natural isomer of glutamine from the resulting reaction products.

References Cited in the file of this patent

UNITED STATES PATENTS 2,508,249    Gleim _____ May 16, 1950

OTHER REFERENCES

Fox et al., J. Am. Chem. Soc. 72 (1950) 5087.
Green et al., J. Biol. Chem. 197 (1952) 772, 777–778.